United States Patent
Kyou et al.

(10) Patent No.: US 11,222,332 B2
(45) Date of Patent: Jan. 11, 2022

(54) ELECTRONIC TERMINAL, ELECTRONIC WATCH, SECURITY SETTING METHOD, AND RECORDING MEDIUM

(71) Applicant: CASIO COMPUTER CO., LTD., Tokyo (JP)

(72) Inventors: Kazuho Kyou, Tachikawa (JP); Sadao Nagashima, Tokorozawa (JP); Hiroshi Iwamiya, Ome (JP); Toshihiro Takahashi, Kunitachi (JP); Takahiro Tomida, Hamura (JP); Tsutomu Terazaki, Saitama (JP); Ryo Okumura, Kodaira (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/295,539

(22) Filed: Mar. 7, 2019

(65) Prior Publication Data
US 2019/0295075 A1 Sep. 26, 2019

(51) Int. Cl.
| | |
|---|---|
| G06Q 20/40 | (2012.01) |
| G06Q 20/32 | (2012.01) |
| H04W 76/10 | (2018.01) |
| G06F 1/16 | (2006.01) |
| G06Q 20/20 | (2012.01) |

(52) U.S. Cl.
CPC ............ G06Q 20/40 (2013.01); G06F 1/163 (2013.01); G06Q 20/20 (2013.01); G06Q 20/325 (2013.01); G06Q 20/327 (2013.01); H04W 76/10 (2018.02)

(58) Field of Classification Search
CPC .... G06Q 20/322; G06Q 20/40; G06Q 20/352; G06Q 20/108; G06Q 20/3674; H04L 63/0853; H04B 1/385
See application file for complete search history.

(56) References Cited

U.S. PATENT DOCUMENTS

| | | | |
|---|---|---|---|
| 9,953,312 B2 | 4/2018 | Lee | |
| 9,962,128 B2 | 5/2018 | Shim et al. | |
| 2007/0234059 A1* | 10/2007 | Ohara | H04L 9/3268 |
| | | | 713/176 |

(Continued)

FOREIGN PATENT DOCUMENTS

| | | |
|---|---|---|
| CN | 104850769 A | 8/2015 |
| CN | 106231008 A | 12/2016 |

(Continued)

OTHER PUBLICATIONS

Extended European Search Report (EESR) dated Jun. 28, 2019 issued in European Application No. 19162471.7.

(Continued)

*Primary Examiner* — Olabode Akintola
*Assistant Examiner* — Suckhwan Chon
(74) *Attorney, Agent, or Firm* — Holtz, Holtz & Volek PC

(57) ABSTRACT

An electronic terminal capable of using a function of payment includes a wearing detector, a communicator, and a processor. The wearing detector detects whether the electronic terminal is worn by a user. The communicator communicates with a wireless communication apparatus via near field communication. The processor changes, based on information that is obtained by the wearing detector and the communicator, whether to enable or disable use of the function of payment.

11 Claims, 12 Drawing Sheets

(56) References Cited

U.S. PATENT DOCUMENTS

| | | | |
|---|---|---|---|
| 2010/0063906 A1* | 3/2010 | Nelsen | G06Q 40/12 705/30 |
| 2011/0205851 A1* | 8/2011 | Harris | G04G 9/0064 368/14 |
| 2014/0058935 A1 | 2/2014 | Mijares | |
| 2014/0282866 A1* | 9/2014 | Jakobsson | H04L 63/08 726/3 |
| 2016/0034887 A1 | 2/2016 | Lee | |
| 2016/0359850 A1* | 12/2016 | Weiss | G06Q 20/40145 |
| 2016/0379205 A1 | 12/2016 | Margadoudakis | |
| 2017/0048224 A1* | 2/2017 | Teraoka | H04L 63/107 |
| 2017/0300904 A1* | 10/2017 | Chung | G06Q 20/20 |
| 2017/0357973 A1* | 12/2017 | Van Os | G06Q 20/321 |

FOREIGN PATENT DOCUMENTS

| | | |
|---|---|---|
| EP | 2980741 A1 | 2/2016 |
| JP | H11282757 A | 10/1999 |
| JP | 2010206668 A | 9/2010 |
| JP | 2010271889 A | 12/2010 |
| JP | 2017142651 A | 8/2017 |
| JP | 2017151943 A | 8/2017 |
| WO | 2014143916 A2 | 9/2014 |

OTHER PUBLICATIONS

Chinese Office Action (and English language translation thereof) dated Oct. 22, 2020 issued in Chinese Application No. 201910222562.3.

* cited by examiner

ELECTRONIC TERMINAL, ELECTRONIC WATCH, SECURITY SETTING METHOD, AND RECORDING MEDIUM

CROSS-REFERENCE TO RELATED APPLICATION

This application claims the benefit of Japanese Patent Application No. 2018-055701, filed on Mar. 23, 2018, the entire disclosure of which is incorporated by reference herein.

TECHNICAL FIELD

The technical field relates to an electronic terminal, an electronic watch, a security setting method, and a recording medium.

BACKGROUND

Cell-phones that have the capability of making payments with electronic money or credit cards have been in wide use. Moreover, Unexamined Japanese Patent Application Kokai Publication No. 2010-271889 describes a communication terminal apparatus or the like that provides an application for making a payment on a cell-phone that has the capability of making payments with electronic money in place of electronic money services when the electronic money charge balance is zero.

The communication terminal apparatus that described in Unexamined Japanese Patent Application Kokai Publication No. 2010-271889 can fill in for making a payment by an acting payment application making different types of electronic money services cooperate. This communication terminal apparatus does not take into account the security and may lose all available charge balance of the electronic money service when, for example, the communication terminal apparatus is stolen by somebody. In other words, the function of payment of the prior art communication terminal apparatus has room for improving security techniques.

SUMMARY

An electronic terminal capable of using a function of payment according to an aspect of the present disclosure includes a wearing detector, a communicator, and a processor. The wearing detector detects whether the electronic terminal is worn by a user. The communicator communicates with a wireless communication apparatus via near field communication. The processor changes, based on information that is obtained by the wearing detector and the communicator, whether to enable or disable use of the function of payment.

BRIEF DESCRIPTION OF THE DRAWINGS

A better understanding of this application can be obtained when the following detailed description is considered in conjunction with the following drawings, in which.

DETAILED DESCRIPTION

Embodiments are described hereafter, with reference to the drawings. Here, in the figures, the same or corresponding parts are referred to by the same reference numbers.

Embodiment 1

Figure 1:
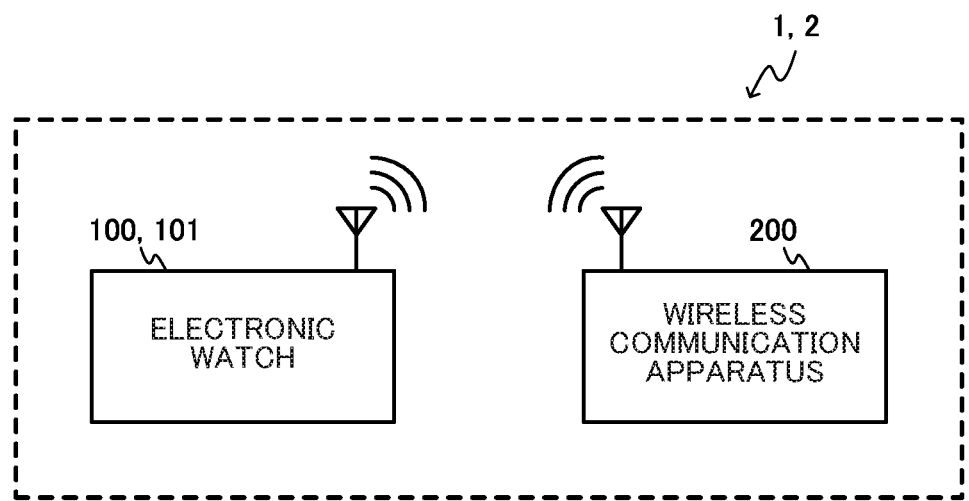
FIG. 1 is an illustration that shows an exemplary configuration of the security setting system according to Embodiment 1 of the present disclosure.

A security setting system 1 according to Embodiment 1 comprises, as shown in FIG. 1, an electronic watch 100 and a wireless communication apparatus 200. The electronic watch 100 is a wristwatch type electronic terminal that comprises the functions of a watch, near field communication, and payment. The electronic watch 100 wireless-communicates with the wireless communication apparatus 200 based on a near field communication standard such as Bluetooth (registered trademark) Low Energy (hereafter, the BLE). The wireless communication apparatus 200 is a portable electronic device that comprises the function of near field communication that allows for communication with the electronic watch 100. The wireless communication apparatus 200 is, for example, a cell-phone, a smartphone, a personal digital assistant (PDA), a notebook type personal computer (PC), a tablet type terminal, a wearable terminal, or the like.

Figure 2:
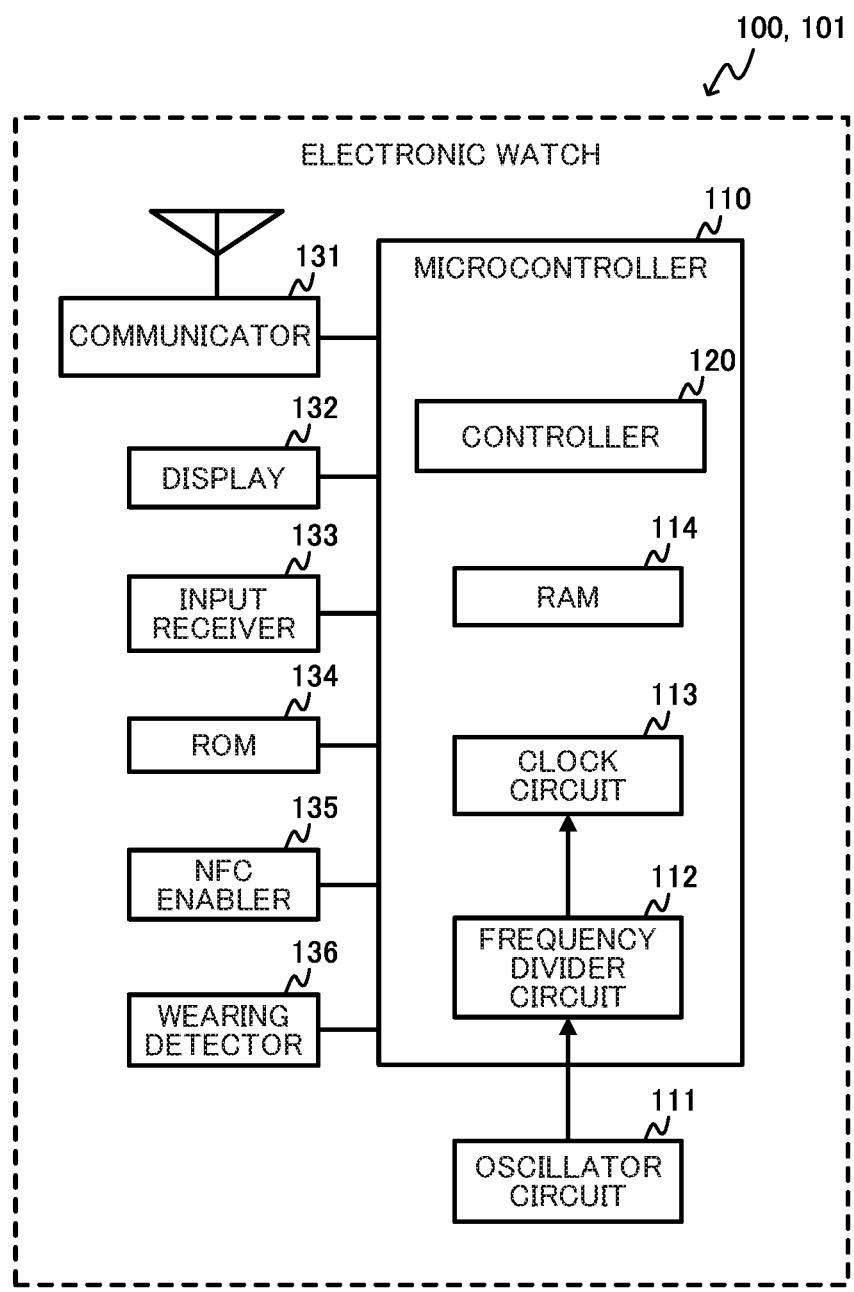
FIG. 2 is a diagram that shows an exemplary configuration of the electronic watch according to Embodiment 1.

The electronic watch 100 according to Embodiment 1 comprises, in hardware configuration, as shown in FIG. 2, a microcontroller 110, an oscillator circuit 111, a communicator 131, a display 132, an input receiver 133, a read-only memory (ROM) 134, a near field communication (NFC) enabler 135, and a wearing detector 136.

The microcontroller 110 comprises a frequency divider circuit 112, a clock circuit 113, a random access memory (RAM) 114, and a controller 120. Here, the frequency divider circuit 112, the clock circuit 113, and the RAM 114 are not necessarily provided within the microcontroller 110 and may be provided outside the microcontroller 110. Moreover, the oscillator circuit 111 and the ROM 134 are not necessarily provided outside the microcontroller 110 and may be provided within the microcontroller 110.

The oscillator circuit 111 generates and outputs a given frequency signal (a clock signal) by oscillating an oscillator such as a crystal oscillator.

The frequency divider circuit 112 divides the frequency signal that is entered by the oscillator circuit 111 to signals of a frequency that is used by the clock circuit 113 and the controller 120 and outputs the signals. The frequency of the signals that are output by the frequency divider circuit 112 may be changed based on a setting by the controller 120.

The clock circuit 113 counts oscillation of the signal that is entered by the frequency divider circuit 112 to measure the current time. Here, the clock circuit 113 may be configured by a piece of software that changes the value to store in the RAM 114 in every given time (for example, one second) or alternatively, may be configured by a dedicated piece of hardware. The time that is measured by the clock circuit 113 may be any of the following: the cumulated time since a given time, the coordinated universal time (UTC), a local standard time such as the Japan standard time (JST), or the time of a preset city (a local time). Moreover, the time that is measured by the clock circuit 113 does not always need to be in the format of yy/mm/dd/hh/mm/ss. Here, in this embodiment, the oscillator circuit 111, the frequency divider circuit 112, and the clock circuit 113 form a clock that keeps date and time.

The RAM 114 is a volatile memory such as a static random access memory (SRAM) and a dynamic random access memory (DRAM) and form storage together with the ROM 134. The RAM 114 stores, as the work memory, temporary data, various setting data, image data to display on the display 132, and the like. In this embodiment, image data are image data that present, for example, the current time, year/month/date, the day of the week, the remaining battery level, and the like.

The controller 120 comprises a central processing unit (CPU) and the like and performs various arithmetic operations to comprehensively control the entire operation of the electronic watch 100. The controller 120 reads control programs that are stored in the ROM 134 and performs arithmetic operation control, display control, and the like regarding various functions of the electronic watch 100 while using the RAM 114 as the work memory. Moreover, the controller 120 comprises the function of a timer and can measure whether a given time has elapsed.

The communicator 131 comprises a radio frequency (RF) circuit, a base band (BB) circuit, an antenna, and the like, and performs wireless communication with the wireless communication apparatus 200 based on a near field communication standard (such as the BLE standard). The near field communication standard is not restricted to the BLE standard. However, it is assumed that the communicator 131 performs wireless communication based on the BLE standard in Embodiment 1.

The display 132 displays the time and data regarding various functions. In this embodiment, the display 132 comprises a liquid crystal panel that digitally displays the time. However, this is not restrictive. For example, the display 132 may comprise a second hand, a minute hand, an hour hand, and the like and analog-display the time. Moreover, the display 132 may comprise a liquid crystal panel in addition to a second hand, a minute hand, an hour hand, and the like and analog-display the time with these hands and further display data regarding various functions on the liquid crystal panel.

The input receiver 133 receives an input operation from the user and sends to the microcontroller 110 an electric signal that corresponds to the input operation as an input signal. The input receiver 133 includes, for example, a push button, a winding crown, a bezel, and the like. Alternatively, as the input receiver 133, a touch sensor may be superimposed on the display screen of the display 132 to form a touch panel together with the display screen. In such a case, the touch sensor detects a contact position and a contact mode regarding a contact operation of the user to the touch sensor and sends an operation signal that corresponds to the detected contact position and contact mode to the microcontroller 110.

The ROM 134 is a nonvolatile memory such as a Mask ROM and a flash memory and forms the storage together with the RAM 114. The ROM 134 stores control programs and initial setting data. Control programs that are stored in the ROM 134 include a program for the security setting procedure that is described later.

The NFC enabler 135 comprises a memory that stores data regarding electronic money and credit cards, an antenna, and the like, and communicates with an external reader/writer via an NFC communication standard (for example, a non-contact type integrated circuit (IC) card communication standard such as FeliCa (registered trademark)). The NFC enabler 135 enables the electronic watch 100 to comprise the function that is equivalent to a non-contact type IC card for electronic money or a non-contact type IC card with the credit card function.

The wearing detector 136 comprises a sensor that detects whether the electronic watch 100 is worn on the arm. For example, the wearing detector 136 comprises a capacitance type touch sensor that detects contact of the electronic watch 100 to an arm, a temperature sensor that detects temperature change on the back of the electronic watch 100, a switch that detects whether the buckle of the electronic watch 100 is fastened, or the like.

The controller 120 of the electronic watch 100 can realize various functions by executing programs that are recorded on the ROM 134. One of such various functions by the controller 120 is the BLE cooperative function. The BLE cooperative function is a function that enables the electronic watch 100 to cooperate with the wireless communication apparatus 200 that is connected via the BLE standard so as to be able to browse personal information and write information in the wireless communication apparatus 200 on the electronic watch 100 or receive a notice from the wireless communication apparatus 200.

Figure 3:
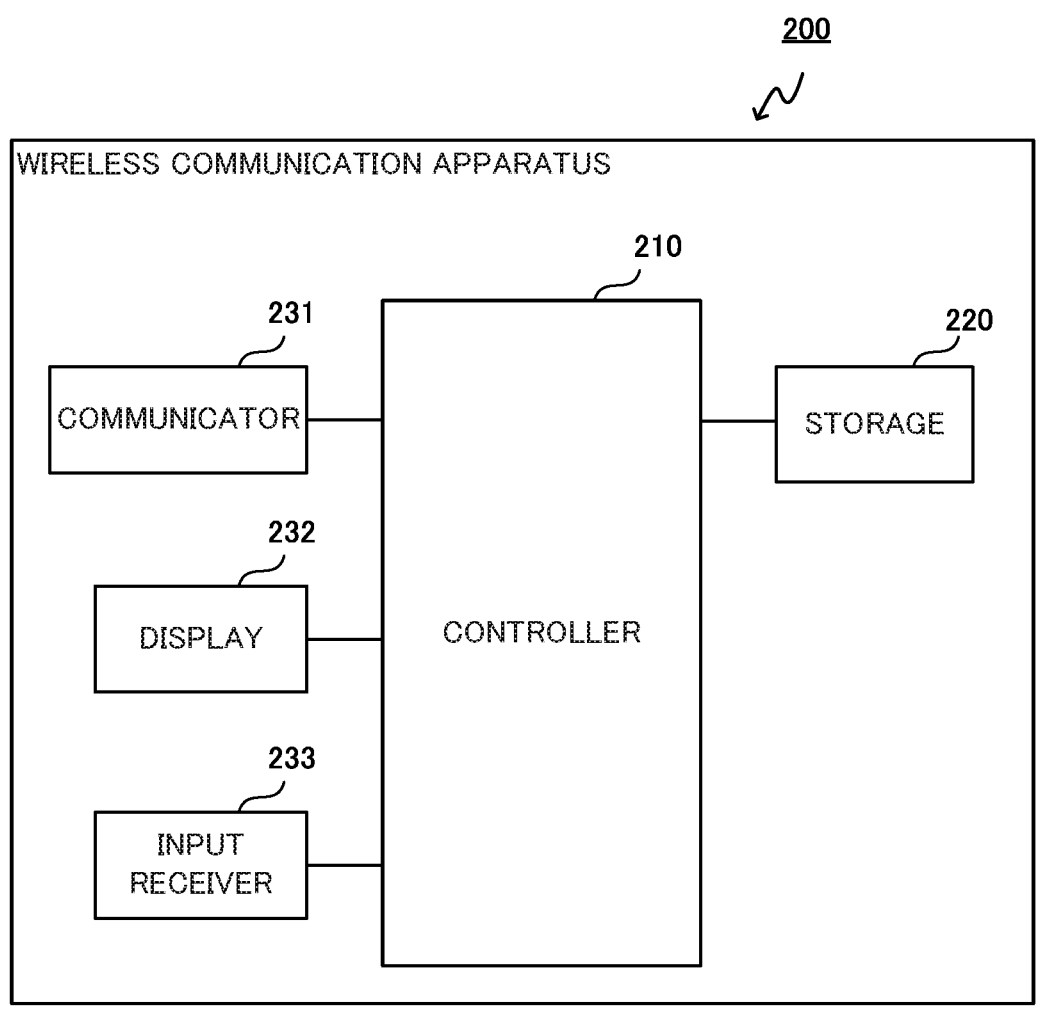
FIG. 3 is a diagram that shows an exemplary configuration of the wireless communication apparatus according to Embodiment 1.

The configuration of the electronic watch 100 according to Embodiment 1 is described above. Subsequently, the functional configuration of the wireless communication apparatus 200 according to Embodiment 1 will be described. As shown in FIG. 3, the wireless communication apparatus 200 comprises a controller 210, a storage 220, a communicator 231, a display 232, and an input receiver 233.

The controller 210 comprises a processor such as a CPU and executes programs that are stored in the storage 220 to control the entire operation of the wireless communication apparatus 200. The controller 210 has the capability of multithreading and can execute multiple threads (different process flows) in parallel.

The storage 220 comprises a ROM and a RAM and stores programs that are executed by the controller 210 and necessary data.

The communicator 231 comprises an RF circuit, a BB circuit, an antenna, and the like, and performs wireless communication with the electronic watch 100 based on a near field communication standard (such as the BLE standard). The near field communication standard is not restricted to the BLE standard. However, it is assumed that the communicator 231 performs wireless communication based on the BLE standard in Embodiment 1. Moreover, the communicator 231 can acquire received signal strength indicator (RSSI) values that are an indicator of the electric wave strength when electric waves that are transmitted by the electronic watch 100 are received.

The display 232 comprises a liquid crystal display (LCD), an electro-luminescence (EL) display, or the like.

The input receiver 233 comprises, for example, operation buttons, a touch panel, and the like and serves as an interface for receiving operations of the user.

Figure 4:
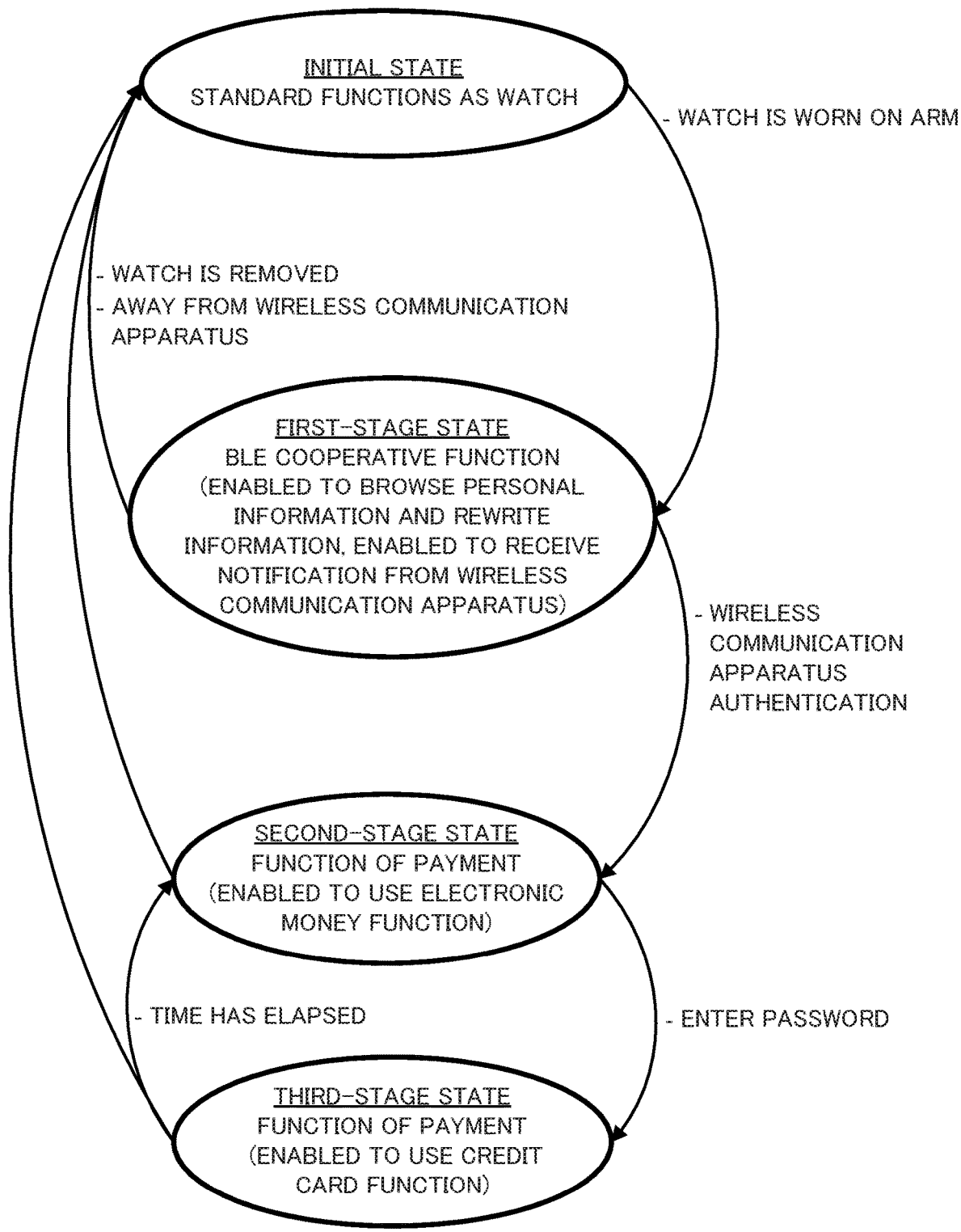
FIG. 4 is an illustration for explaining the security state of the electronic watch according to Embodiment 1.

The configuration of the wireless communication apparatus 200 according to Embodiment 1 is described above. Here, the electronic watch 100 and the wireless communication apparatus 200 are paired and exchange and register device registration information each other after purchased in order to be able to establish wireless connection via the BLE standard. When the electronic watch 100 communicates with the wireless communication apparatus 200 via the BLE standard, the security can be increased by allowing for communication with only the paired wireless communication apparatus 200. However, the security can further be increased by limiting the functions of the electronic watch 100 depending on the status of communication with the wireless communication apparatus 200. The procedure for this purpose (the security setting procedure to increase the security of the electronic watch 100) is a procedure to switch the security state of the electronic watch 100 to multiple stages such as an initial state, a first-stage state, a second-stage state, and a third-stage state as shown in FIG. 4.

The initial state is a state in which the electronic watch 100 can perform only the standard functions as a watch (the functions of a watch, a stopwatch, an alarm, and the like). The first-stage state is a state in which the electronic watch 100 can use the BLE cooperative function in addition to the standard functions as a watch. The second-stage state is a state in which the electronic watch 100 can use the function of payment using electronic money in addition to the function in the first-stage state. The third-stage state is a state in which the electronic watch 100 can use the function of payment using a credit card in addition to the function in the second-stage state. Here, the amount of payment with a credit card is generally higher than the amount of payment with electronic money. Therefore, in this embodiment, the function of payment with a credit card is usable only in the highest security level state (the third-stage state).

Transition of the states in security setting of the electronic watch 100 will be described with reference to FIG. 4. When activated, the electronic watch 100 first becomes in the initial state. Then, as the user wears the electronic watch 100 on his arm, the electronic watch 100 establishes wireless connection to the paired wireless communication apparatus 200 and shifts to the first-stage state. Subsequently, as the electronic watch 100 is authenticated through communication with the wireless communication apparatus 200, the electronic watch 100 shifts to the second-stage state. Subsequently, as the user enters a password into the electronic watch 100 or the wireless communication apparatus 200, the electronic watch 100 shifts to the third-stage state. Then, as a given time (for example, five minutes) has elapsed in the third-stage state, the electronic watch 100 shifts to the second-stage state. Moreover, when the electronic watch 100 is removed from the arm or a given cancellation condition is satisfied (a notice of cancellation is received from the wireless communication apparatus 200) in the first-stage state, the second-stage state, and the third-stage state, the electronic watch 100 shifts to the initial state.

Next, the security setting procedure to perform the above security setting will be described with reference to FIG. 5. As the electronic watch 100 is activated, execution of the security setting procedure starts.

First, the controller 120 of the electronic watch 100 sets the security state of the electronic watch 100 to the initial state (Step S101). The setting to the initial state cuts off wireless connection to the wireless communication apparatus 200 by means of the communicator 131 cut off and disables (disables the use of) the function of payment by means of the NFC enabler 135, and thus the electronic watch 100 can use only the standard functions as a watch. Next, the controller 120 performs the first-stage authentication procedure (Step S102). The first-stage authentication procedure is a procedure to set the security state of the electronic watch 100 to the first-stage state when a condition is satisfied. Details of the procedure will be described later. Next, the controller 120 performs the second-stage authentication procedure (Step S103). The second-stage authentication procedure is a procedure to set the security state of the electronic watch 100 to the second-stage state when a condition is satisfied. Details of the procedure will be described later. Next, the controller 120 performs the third-stage authentication procedure (Step S104). The third-stage authentication procedure is a procedure to set the security state of the electronic watch 100 to the third-stage state when a condition is satisfied. Details of the procedure will be described later.

Subsequently, the controller 120 determines whether the communicator 131 has received a notice of cancellation (termination indication) from the wireless communication apparatus 200 (Step S105). A notice of cancellation is used to notify the other communication party in ongoing wireless communication of cutting off the wireless communication. If a notice of cancellation is received (Step S105; Yes), the controller 120 cuts of the wireless connection to the wireless communication apparatus 200 (Step S106) and proceeds to Step S202 of the first-stage authentication procedure (FIG. 6) that is described later. If no notice of cancellation is received (Step S105; No), the controller 120 detects whether the electronic watch 100 is removed from the arm using the wearing detector 136 (Step S107). If the electronic watch 100 is removed from the arm (Step S107; Yes), the controller 120 cuts off the wireless connection to the wireless communication apparatus 200 (Step S108) and returns to Step S101.

If the electronic watch 100 is not removed from the arm (Step S107; No), the controller 120 determines whether a given time (for example, three minutes) has elapsed using the timer function (Step S109). If the given time has not elapsed (Step S109; No), the controller 120 returns to Step S105. If the given time has elapsed (Step S109; Yes), the controller 120 sets the security state of the electronic watch 100 to the second-stage state (Step S110) and returns to Step S104.

The security setting procedure is described above. Next, the first-stage authentication procedure that is executed in Step S102 of the security setting procedure (FIG. 5) will be described with reference to FIG. 6.

First, the controller 120 detects whether the electronic watch 100 is worn on the arm by means of the wearing detector 136 (Step S201). Step S201 is also called a wearing detection step. If not worn on the arm (Step S201; No), the controller 120 returns to Step S201. If worn on the arm (Step S201; Yes), the controller 120 attempts to establish wireless connection to the wireless communication apparatus 200 by means of the communicator 131 (Step S202) and determines whether the wireless connection is successful (Step S203).

If the wireless connection is unsuccessful (Step S203; No), the controller 120 detects whether the electronic watch 100 is removed from the arm by mean of the wearing detector 136 (Step S204). If the electronic watch 100 is not removed from the arm (Step S204; No), the controller 120 returns to Step S202. If the electronic watch 100 is removed from the arm (Step S204; Yes), the controller 120 cuts off the wireless connection to the wireless communication apparatus 200 by means of the communicator 131 (Step S205) and returns to Step S101 of the security setting procedure (FIG. 5).

On the other hand, if the wireless connection is successful in Step S203 (Step S203; Yes), the controller 120 transmits a notification permission message to the wireless communication apparatus 200 by means of the communicator 131 (Step S206). With the electronic watch 100 transmitting a notification permission message to the wireless communication apparatus 200, the electronic watch 100 is enabled to receive notification from the wireless communication apparatus 200.

Next, the controller 120 sets the security state of the electronic watch 100 to the first-stage state (Step S207). This setting enables the BLE cooperative function to be used between the electronic watch 100 and the wireless communication apparatus 200. Then, the controller 120 sets and transmits to the wireless communication apparatus 200 a condition for cancelling the wireless connection between the electronic watch 100 and the wireless communication apparatus 200 (a cancellation condition) (Step S208) and ends the first-stage authentication procedure. The cancellation condition that is set in Step S208 is, for example, that "the RSSI value of electric waves from the electronic watch 100 is lower than a reference value" and the like. When the cancellation condition is satisfied, the wireless communication apparatus 200 transmits a notice of cancelation to the electronic watch 100 and the wireless connection between the electronic watch 100 and the wireless communication apparatus 200 is cut off.

The first-stage authentication procedure is described above. With this first-stage authentication procedure, the electronic watch 100 is enabled to use the BLE cooperative function given that wireless connection to the wireless communication apparatus 200 is established. Next, the second-stage authentication procedure that is executed in Step S103 of the security setting procedure (FIG. 5) will be described with reference to FIG. 7.

First, the controller 120 determines whether the communicator 131 has received a notice of cancellation from the wireless communication apparatus 200 (Step S301). If a notice of cancellation is received (Step S301; Yes), the controller 120 cuts off the wireless connection to the wireless communication apparatus 200 by means of the communicator 131 (Step S302) and proceeds to Step S202 of the first-stage authentication procedure (FIG. 6). If no notice of cancellation is received (Step S301; No), the controller 120 detects whether the electronic watch 100 is removed from the arm by means of the wearing detector 136 (Step S303). If the electronic watch 100 is removed from the arm (Step S303; Yes), the controller 120 cuts off the wireless connection to the wireless communication apparatus 200 by means of the communicator 131 (Step S304) and returns to Step S101 of the security setting procedure (FIG. 5).

If the electronic watch 100 is not removed from the arm (Step S303; No), the controller 120 determines whether Notification is successively received at the communicator 131 from the wireless communication apparatus 200 for a reference authentication time (for example, five minutes) (Step S305). Step S305 is also called a communication step. Here, the Notification is used for the wireless communication apparatus 200 to periodically notify the electronic watch 100 that wireless connection is established, and transmitted from the wireless communication apparatus 200 to the electronic watch 100, for example, once in every 10 seconds.

If the electronic watch 100 is not successively receiving Notification from the wireless communication apparatus 200 for the reference authentication time (Step S305; No), the controller 120 returns to Step S301. If the electronic watch 100 is successively receiving Notification from the wireless communication apparatus 200 for the reference authentication time (Step S305; Yes), the controller 120 sets the security state of the electronic watch 100 to the second-stage state (Step S306) and ends the second-stage authentication procedure. Step S306 is also called a security setting step. With the security state being set to the second-stage state, the electronic watch 100 is enabled to use the function of payment with electronic money by means of the NFC enabler 135.

Figure 8:
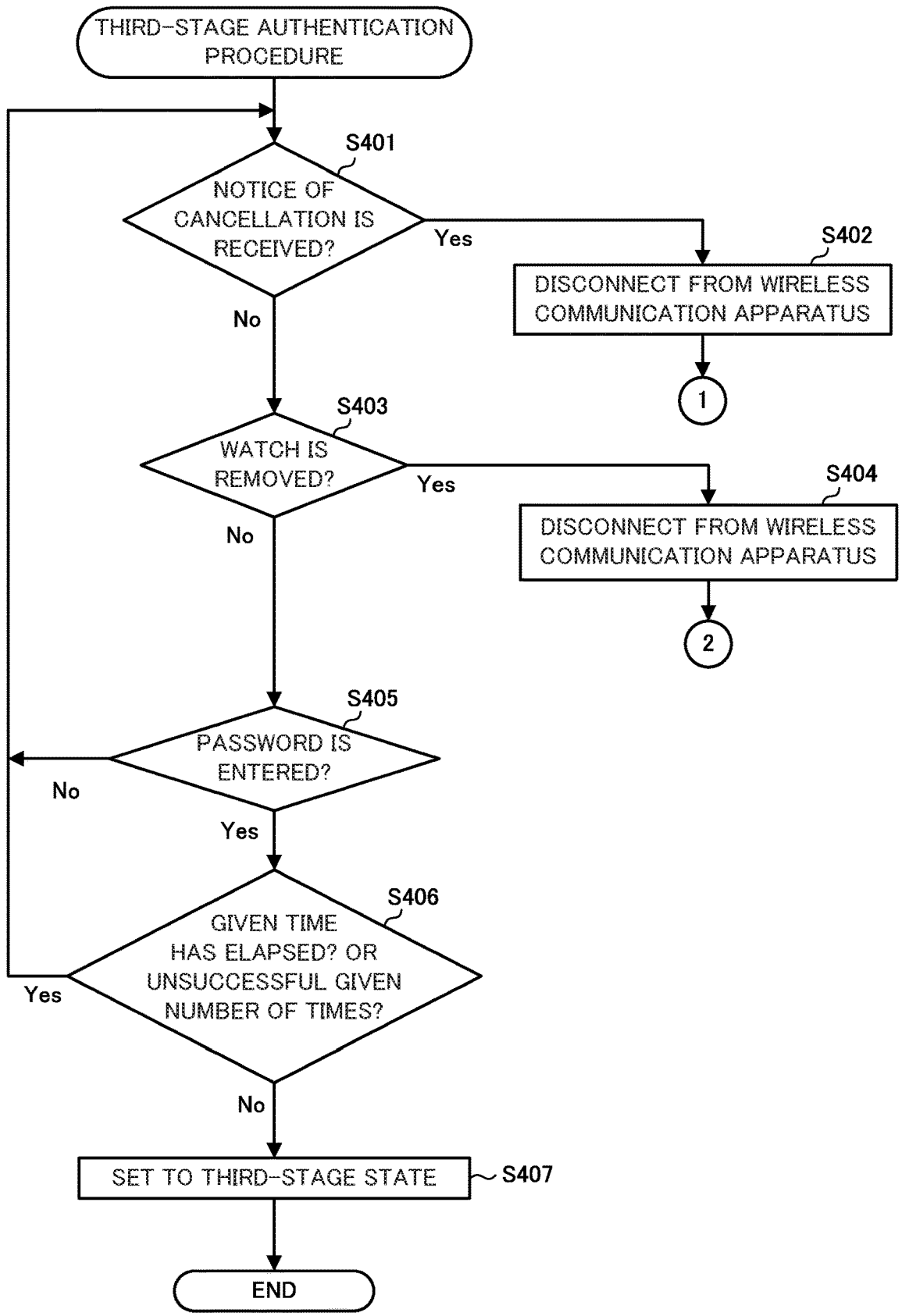
FIG. 8 is a flowchart of the third-stage authentication procedure of the electronic watch according to Embodiment 1.

The second-stage authentication procedure is described above. With this second-stage authentication procedure, the electronic watch 100 is enabled to use the function of payment with electronic money given that wireless connection to the wireless communication apparatus 200 is kept for a given time. Next, the third-stage authentication procedure that is executed in Step S104 of the security setting procedure (FIG. 5) will be described with reference to FIG. 8.

First, the controller 120 determines whether the communicator 131 has received a notice of cancellation from the wireless communication apparatus 200 (Step S401). If a notice of cancellation is received (Step S401; Yes), the controller 120 cuts off the wireless connection to the wireless communication apparatus 200 by means of the communicator 131 (Step S402) and proceeds to Step S202 of the first-stage authentication procedure (FIG. 6). If no notice of cancellation is received (Step S401; No), the controller 120 detects whether the electronic watch 100 is removed from the arm by means of the wearing detector 136 (Step S403). If the electronic watch 100 is removed from the arm (Step S403; Yes), the controller 120 cuts off the wireless connection to the wireless communication apparatus 200 by means of the communicator 131 (Step S404) and returns to Step S101 of the security setting procedure (FIG. 5).

If the electronic watch 100 is not removed from the arm (Step S403; No), the controller 120 determines whether the user has entered a password from the input receiver 133 (Step S405). In Step S405, the input receiver 133 functions as a password acquirer. A password can assumingly be entered by various methods and, for example, entered by rotating the bezel of the electronic watch 100 in a similar manner to the dial of a safe. Moreover, entering a password is not restricted to entering from the input receiver 133. The controller 120 may acquire a password by receiving a password at the communicator 131 that is entered through the input receiver 233 of the wireless communication apparatus 200. In such a case, the communicator 131 functions as a password acquirer.

If no password is entered (Step S405; No), the controller 120 returns to Step S401. If a password is entered (Step S405; Yes), the controller 120 determines whether it takes a given time (for example, one minute) or more to enter a password or a password is unsuccessfully entered a given number of times (for example, three times) (Step S406). If it takes the given time or more to enter a password or a password is unsuccessfully entered the given number of times (Step S406; Yes), the controller 120 returns to Step S401. In Step S406, the controller 120 functions as a password determiner.

If it takes less than the given time to enter a password or a password is successfully entered in less than the given number of times (Step S406; No), the controller 120 sets the security state of the electronic watch 100 to the third-stage state (Step S407) and ends the third-stage authentication procedure. With the security state being set to the third-stage state, the electronic watch 100 is enabled to use the function of payment with a credit card using the NFC enabler 135.

Figure 9:
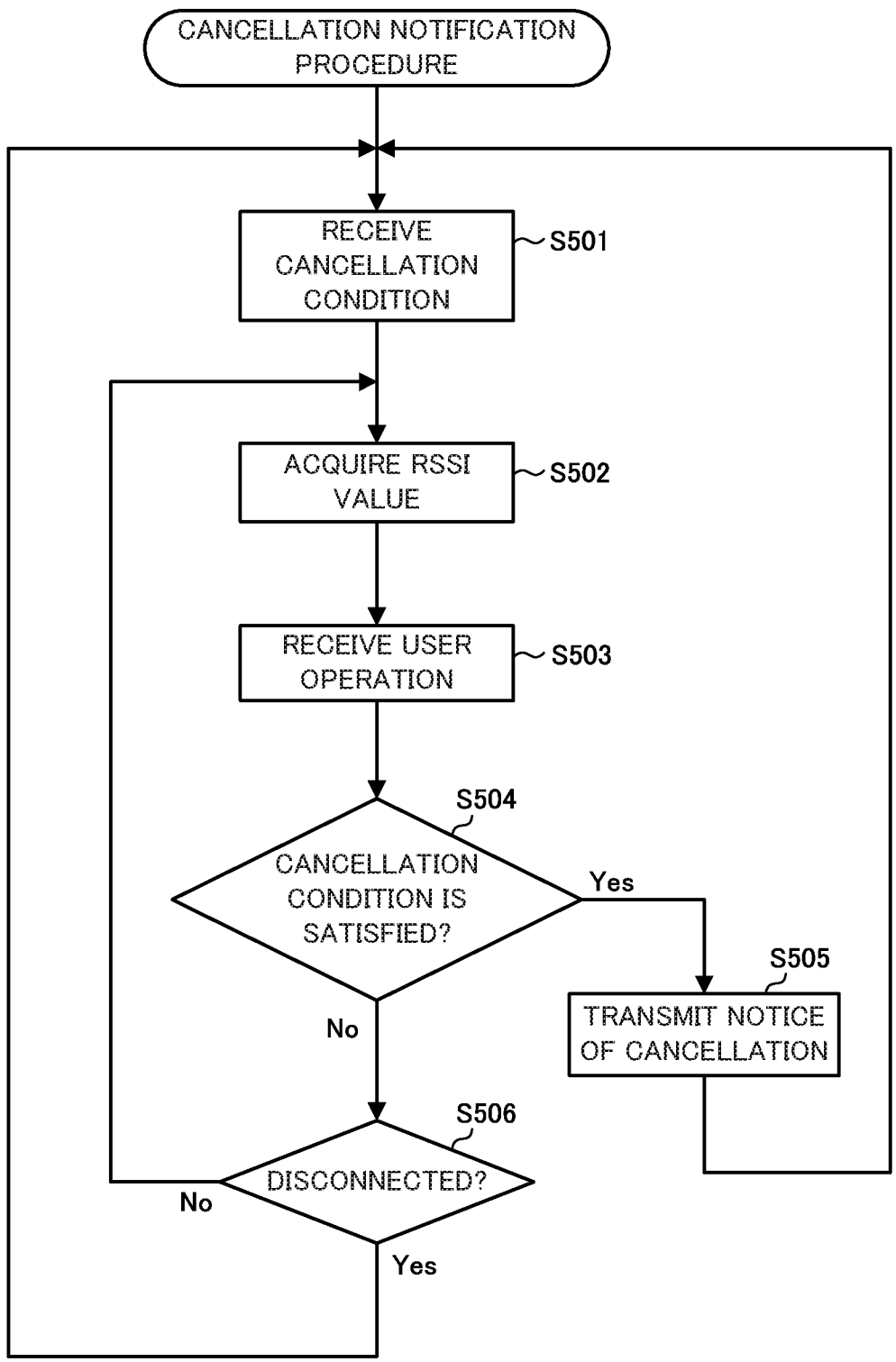
FIG. 9 is a flowchart of the cancellation notification procedure of the wireless communication apparatus according to Embodiment 1.

The third-stage authentication procedure is described above. With this third-stage authentication procedure, the electronic watch 100 is enabled to use the function of payment with a credit card given that a correct password is entered. Next, the cancellation notification procedure of the wireless communication apparatus 200 will be described with reference to FIG. 9. This cancellation notification procedure is activated as a thread as the wireless communication apparatus 200 is activated, and execution of this procedure starts in parallel to other threads.

First, the controller 210 of the wireless communication apparatus 200 receives a cancellation condition that is transmitted by the electronic watch 100 using the communicator 231 (Step S501). The cancellation condition is, as described above, a condition for canceling the wireless connection between the electronic watch 100 and the wireless communication apparatus 200 and, for example, that "the RSSI value of electric waves from the electronic watch 100 is lower than a reference value" or the like. Unless a cancellation condition is transmitted by the electronic watch 100, the controller 210 waits in Step S501 until transmitted.

If a cancellation condition is received, the controller 210 acquires the RSSI value of electric waves of the electronic watch 100 using the communicator 231 (Step S502). Then, the controller 210 receives a user operation using the input receiver 233 (Step S503). If there is no particular user operation, the processing in Step S503 is skipped.

Then, the controller 210 determines whether the cancellation condition that is received in Step S501 is satisfied (Step S504). As the cancellation condition, for example, that "the RSSI value of electric waves from the electronic watch 100 is lower than a reference value" or the like is transmitted by the electronic watch 100. Therefore, the controller 210 compares the reference RSSI value that is received in Step S501 and the RSSI value that is acquired in Step S502 and determines whether the cancellation condition is satisfied. Moreover, if a user operation of "disconnect from the electronic watch 100" or the like is received in Step S503, the cancellation condition is considered to be satisfied.

If the cancellation condition is satisfied (Step S504; Yes), the controller 210 transmits a notice of cancellation to the electronic watch 100 using the communicator 231 (Step S505) and returns to Step S501. If the cancellation condition is not satisfied (Step S504; No), the controller 210 determines whether the wireless connection to the electronic watch 100 is cut off (Step S506). If the wireless connection to the electronic watch 100 is not cut off (Step S506; No), the controller 210 proceeds to Step S502. If the wireless connection to the electronic watch 100 is cut off (Step S506; Yes), the controller 210 returns to Step S501.

With the above cancellation notification procedure, when the strength of electric waves from the electronic watch 100 weakens or the user conducts an operation to cut off the BLE connection, the wireless communication apparatus 200 transmits a notice of cancellation to the electronic watch 100 and the electronic watch 100 that receives the notice of cancellation sets the security state to the initial state. Thus, for example when the user left behind the electronic watch 100 somewhere or the electronic watch 100 is stolen, a notice of cancellation is transmitted from the wireless communication apparatus 200 to the electronic watch 100 and the security state of the electronic watch 100 is shifted to the initial state, whereby the BLE cooperative function and the function of payment are disabled and the security is maintained.

With the above-described security setting procedure of the electronic watch 100, the electronic watch 100 can set the security state progressively to the initial state, the first-stage state, the second-stage state, and the third-stage state. Then, the function of payment with a credit card that is usable only in the third-stage state can be used only when a password is entered, whereby the security is maintained. The function of payment with electronic money that is usable in the second-stage state can be used after authentication by the paired wireless communication apparatus 200, whereby the user-friendliness is not impaired while maintaining the security. Therefore, the electronic watch 100 can improve the technique for increasing the security in using the function of payment.

Modified Embodiment 1 of Embodiment 1

In the above-described Embodiment 1, the electronic watch 100 shifts the security state through wireless connection to the paired wireless communication apparatus 200. Modified Embodiment 1 of Embodiment 1 in which the security is further increased will be described.

The electronic watch 100 according to Modified Embodiment 1 of Embodiment 1 can register an identification number for uniquely identifying the wireless communication apparatus 200 on the ROM 134 (an electrically rewritable flash memory or the like) upon the initial setting after purchased. As the identification number of the wireless communication apparatus 200, for example, the international mobile equipment identity (IMEI), the media access control (MAC) address, or the like can be used. Then, it is forbidden to overwrite the identification number of the wireless communication apparatus 200 that is registered upon the initial setting of the electronic watch 100.

Moreover, the wireless communication apparatus 200 transmits information of the identification number when transmitting Notification (the identification number may be included in a Notification packet).

Then, in Step S305 of the second-stage authentication procedure of the electronic watch 100 according to Modified Embodiment 1 of Embodiment 1 (FIG. 7), the controller 120 does not proceed to Step S306 (does not shift to the second-stage state) unless the controller 120 successively receives Notification for a reference authentication time and the identification number that is transmitted by the wireless communication apparatus 200 matches the identification number that is registered on the electronic watch 100 upon the initial setting.

In Modified Embodiment 1 of Embodiment 1, with the above-described processing, simply being paired does not lead to shifting to the second-stage state, whereby the security level can be increased. Moreover, given that it is forbidden to overwrite the identification number of the wireless communication apparatus 200 that is registered upon the initial setting of the electronic watch 100, when the electronic watch 100 is stolen or the like, it is possible to prevent the thief from overwriting and registering the identification number of his wireless communication apparatus 200 and shifting the security state of the electronic watch 100 to the second-stage state.

Modified Embodiment 2 of Embodiment 1

In Modified Embodiment 1 of Embodiment 1, when the user purchased a new wireless communication apparatus 200, he may wish to change the identification number of the wireless communication apparatus 200 that is registered upon the initial setting of the electronic watch 100. Modified Embodiment 2 of Embodiment 1 for addressing such a case will be described.

In Modified Embodiment 2 of Embodiment 1, the electronic watch 100 comprises, in the third-stage state, not only the function of payment with a credit card but also the function of erasing the identification number of the wireless communication apparatus 200 that is registered on the ROM 134 (an electrically rewritable flash memory or the like) upon the initial setting in addition to the functions of Modified Embodiment 1 of Embodiment 1. Then, the electronic watch 100 can reregister an identification number of the wireless communication apparatus 200 after erasing the identification number. In other words, in registering an identification number on the ROM 134 of the electronic watch 100, it is impossible to overwrite an identification number that is already registered, if any, but upon the initial setting or after erasing the identification number, no identification number is registered on the ROM 134 and if so, it is possible to register an identification number of the wireless communication apparatus 200.

The function of erasing the identification number that is registered on the ROM 134 in the third-stage state is realized by the controller 120 executing an identification number erasing program. Programs for erasing, for example, data that are written at any address on a flash memory pertaining to known techniques and details of the identification number erasing program are omitted. When executing the identification number erasing program, the controller 120 functions as identification number erasing means.

In Modified Embodiment 2 of Embodiment 1, as in Modified Embodiment 1 of Embodiment 1, it is possible to increase the security level, and it is further possible to erase registration of an identification number of the wireless communication apparatus 200 while assuring the security (only in the third-stage state). Subsequently, the user registers the identification number of a new, purchased wireless communication apparatus 200 on the electronic watch 100, whereby the security state of the electronic watch 100 can be shifted to the second-stage state and the third-stage state. Therefore, Modified Embodiment 2 of Embodiment 1 can accommodate a replacement of the wireless communication apparatus 200.

Modified Embodiment 3 of Embodiment 1

Modified Embodiment 2 of Embodiment 1 cannot accommodate a replacement of the wireless communication apparatus 200 when the previously used wireless communication apparatus 200 (with the identification number registered on the electronic watch 100) is broken (because it is impossible to shift to the third-stage state). Modified Embodiment 3 of Embodiment 1 that can accommodate the case in which the wireless communication apparatus 200 is broken or stolen will be described.

In Modified Embodiment 3 of Embodiment 1, the electronic watch 100 comprises, in addition to the configuration of Modified Embodiment 1 of Embodiment 1, a hardware mechanism (such as a switch, an electrode, or the like and which is termed an "identification number eraser") for erasing the identification number that is registered on the ROM 134 of the electronic watch 100. The identification number eraser can be used only when the electronic watch 100 is disassembled and can be used only at a service center of the manufacturer (cannot be used by the user). Then, as in Modified Embodiment 2 of Embodiment 1, the electronic watch 100 is enabled to reregister an identification number of the wireless communication apparatus 200 after the identification number is erased. Here, the identification number eraser functions as identification number erasing means.

When the wireless communication apparatus 200 that has the identification number that is registered on the ROM 134 of the electronic watch 100 is lost (broken, stolen, or the like), the user takes the electronic watch 100 to a service center or the like of the manufacturer. Then, at the service center, after confirming that the user is the legitimate owner of the electronic watch 100, the identification number of the wireless communication apparatus 200 that is registered on the ROM 134 of the electronic watch 100 is erased using the identification number eraser. Subsequently, the user registers the identification number of a new, purchased wireless communication apparatus 200 on the electronic watch 100, whereby the security state of the electronic watch 100 can be shifted to the second-stage state and the third-stage state. Therefore, Modified Embodiment 3 of Embodiment 1 can accommodate the case in which the previously used wireless communication apparatus 200 is no longer usable (broken, stolen, or the like).

Embodiment 2

In Embodiment 1, the electronic watch 100 does not establish a wireless connection to the wireless communication apparatus 200 before the electronic watch 100 is worn on the arm. Embodiment 2 in which the electronic watch 100 periodically establishes a connection to the wireless communication apparatus 200 before the electronic watch 100 is worn on the arm to improve the convenience will be described.

A security setting system 2 according to Embodiment 2 comprises, as in the security setting system 1, an electronic watch 101 and the wireless communication apparatus 200 and is shown in FIG. 1. The configuration of the electronic watch 101 according to Embodiment 2 is the same as that of the electronic watch 100 and shown in FIG. 2. The electronic watch 101 is different from the electronic watch 100 in part of each of the security setting procedure, the first-stage authentication procedure, and the second-stage authentication procedure. Thus, these procedures will be described mainly regarding the difference. First, the security setting procedure of the electronic watch 101 will be described mainly regarding the difference from the security setting procedure of the electronic watch 100 (FIG. 5) with reference to FIG. 10.

Figure 5:
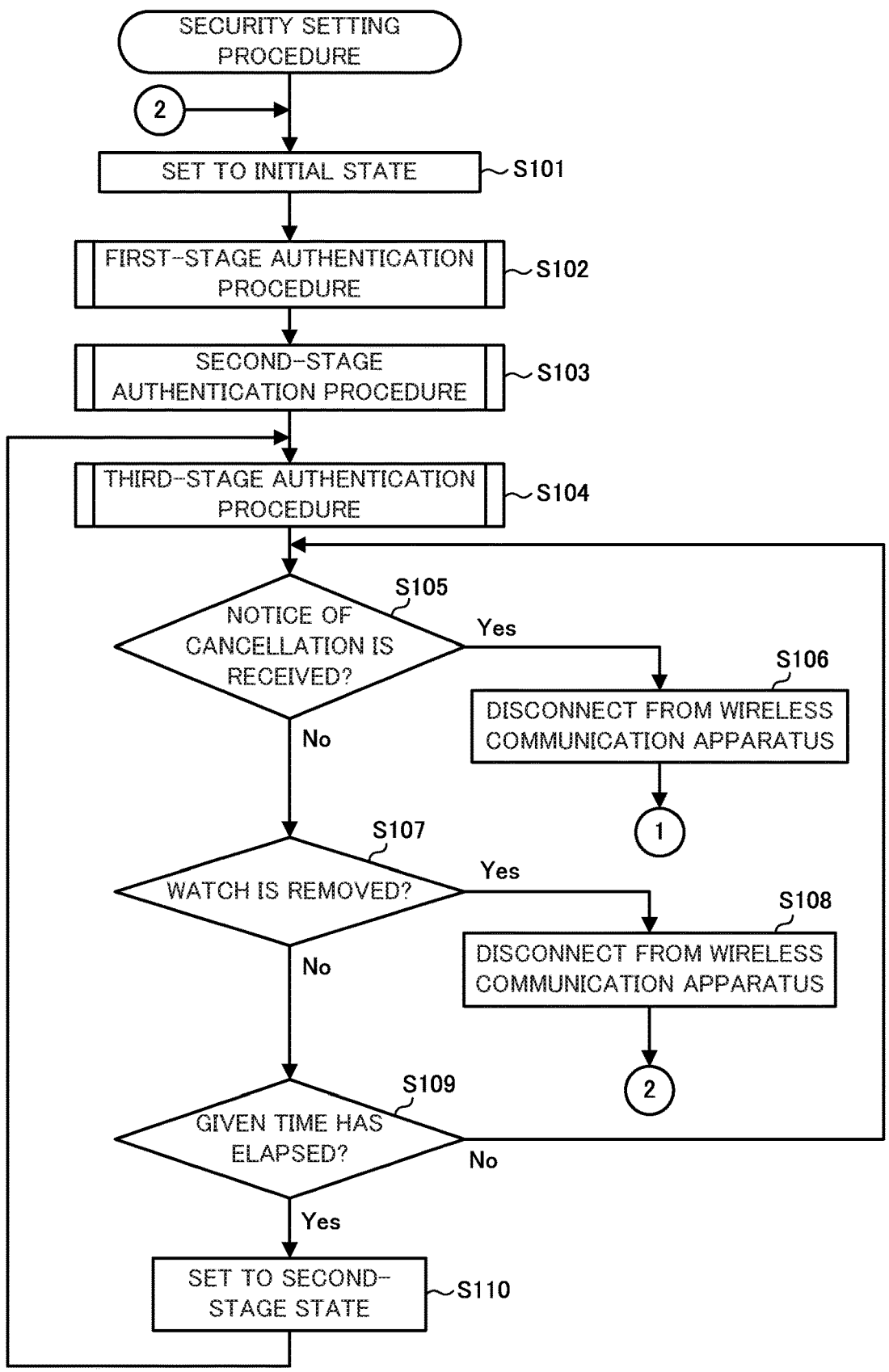
FIG. 5 is a flowchart of the security setting procedure of the electronic watch according to Embodiment 1.
Figure 6:
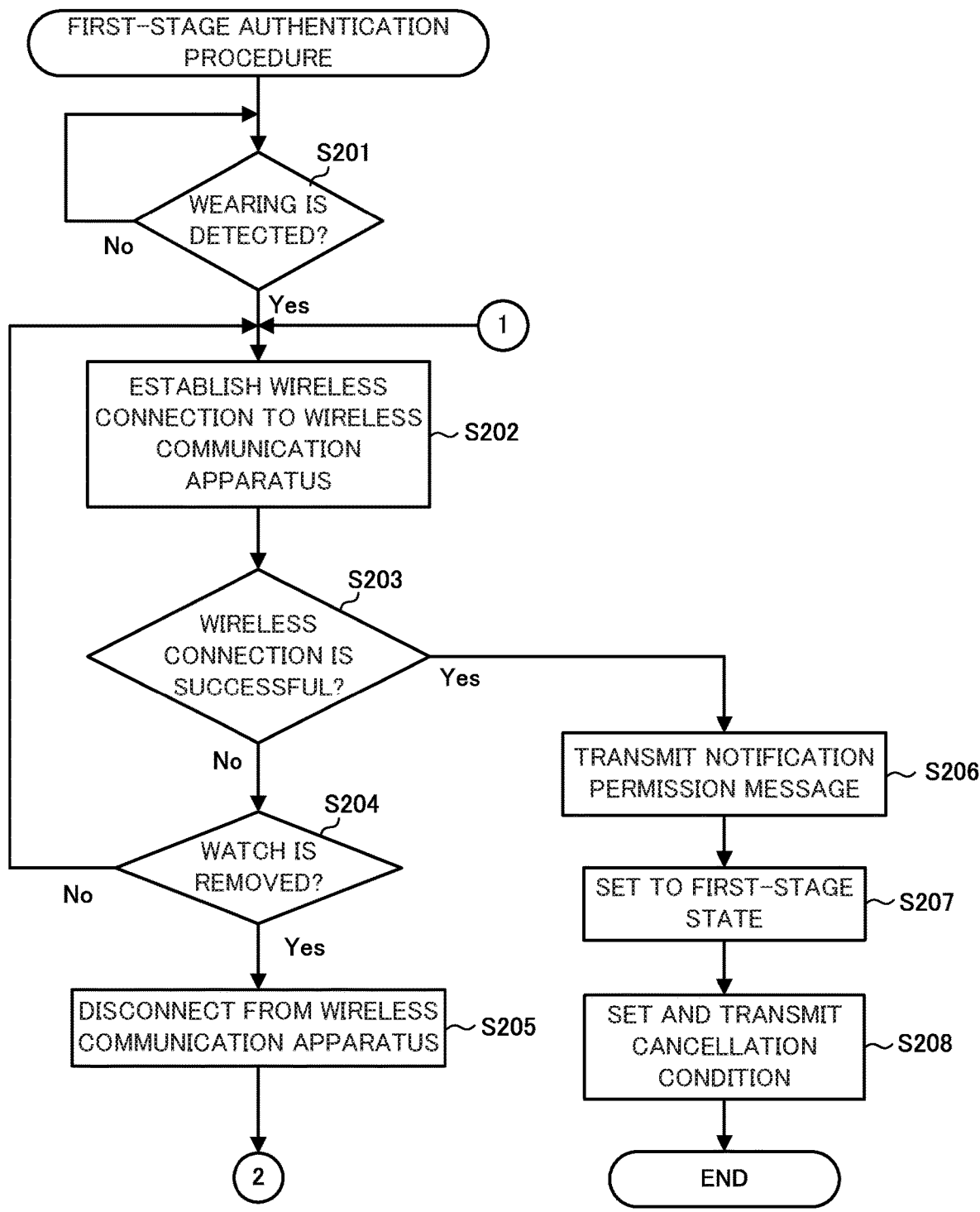
FIG. 6 is a flowchart of the first-stage authentication procedure of the electronic watch according to Embodiment 1.

In the security setting procedure of the electronic watch 101 (FIG. 10), the processing in Step S121 is performed between Steps S101 and S102 of the security setting procedure of the electronic watch 100 (FIG. 5). The other processing is the same as in the security setting procedure of the electronic watch 100 (FIG. 5).

In Step S121, the controller 120 of the electronic watch 101 periodically (for example, in every hour) establishes wireless connection to the wireless communication apparatus 200 for a given connection time (for example, one minute) by means of the communicator 131 and records whether the wireless connection is successful/unsuccessful on the RAM 114 as a log. For example, the controller 120 establishes wireless connection to the wireless communication apparatus 200 for one minute in every hour, cuts off the wireless connection to the wireless communication apparatus 200 after one minute of connection, and records the connection time and whether the connection was successful/unsuccessful ("successful connection" if the wireless connection is established and "unsuccessful connection" if the wireless connection is failed) on the RAM 114 as a log. Then, the electronic watch 101 repeats the operation of establishing wireless connection to the wireless communication apparatus 200 approximately in one hour (in 59 minutes if the given connection time is one minute), cutting off the wireless connection after one minute has elapsed, and recording the log on the RAM 114 until the electronic watch 101 is worn on an arm.

Here, the electronic watch 101 fails to establish a wireless connection to the wireless communication apparatus 200 if the wireless communication apparatus 200 is not near the electronic watch 101 or the wireless communication apparatus 200 is powered off. In such a case, the time of the failure and information of "unsuccessful connection" are recorded on the RAM 114 as a log.

As described above, in the security setting procedure of the electronic watch 101 (FIG. 10), the electronic watch 101 periodically establishes a wireless connection to the wireless communication apparatus 200 and thus can record the status of the connection to the wireless communication apparatus 200 on the log. Next, the first-stage authentication procedure of the electronic watch 101 will be described mainly regarding the difference from the first-stage authentication procedure of the electronic watch 100 (FIG. 6) with reference to FIG. 11.

In the first-stage authentication procedure of the electronic watch 101 (FIG. 11), the determination in Step S221 is performed between Steps S201 and S202 of the first-stage authentication procedure of the electronic watch 100 (FIG. 6). If the determination result is Yes, the processing in Step S222 is performed. The other processing is the same as in the first-stage authentication procedure of the electronic watch 100 (FIG. 6).

Figure 10:
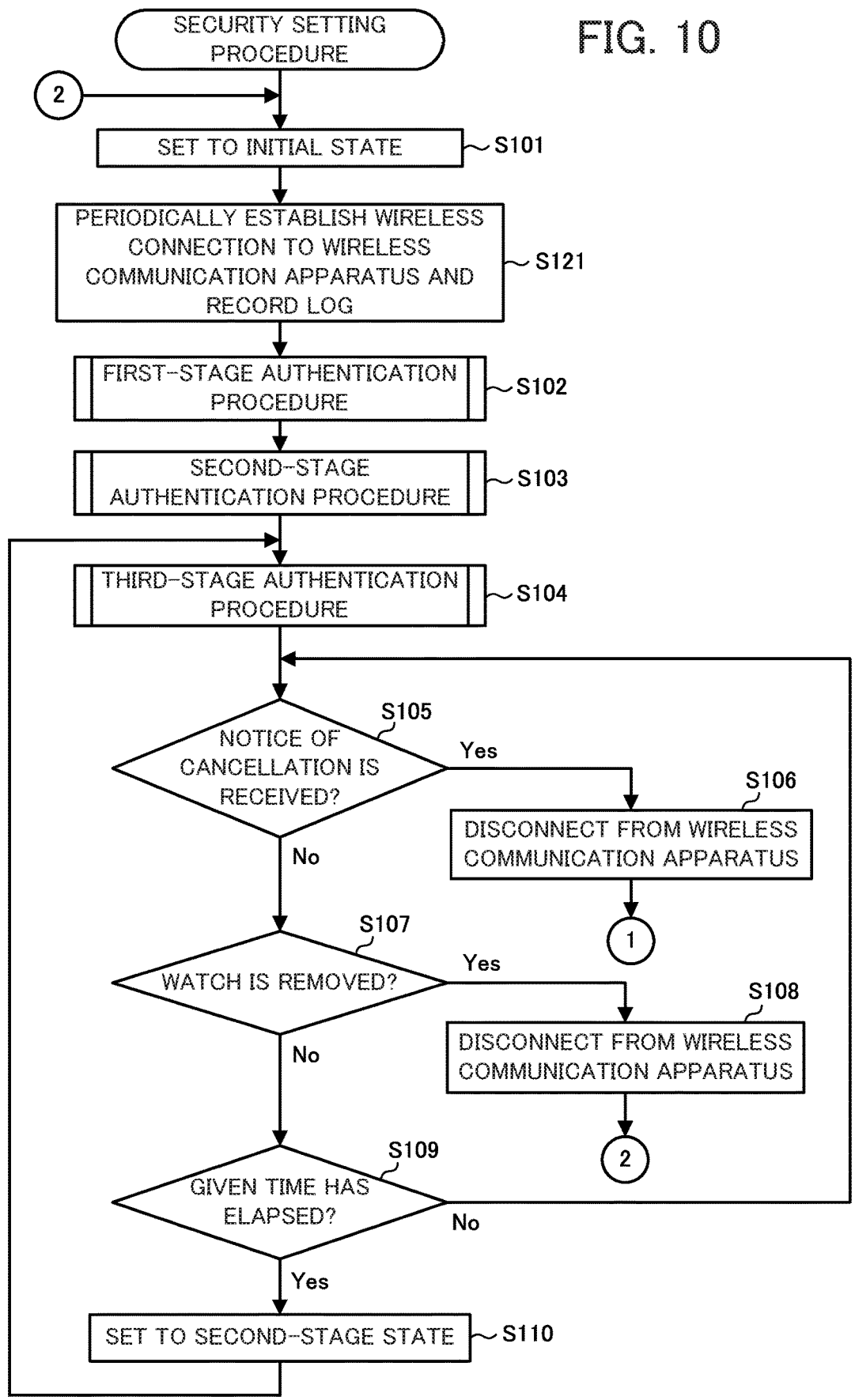
FIG. 10 is a flowchart of the security setting procedure of the electronic watch according to Embodiment 2 of the present disclosure.
Figure 11:
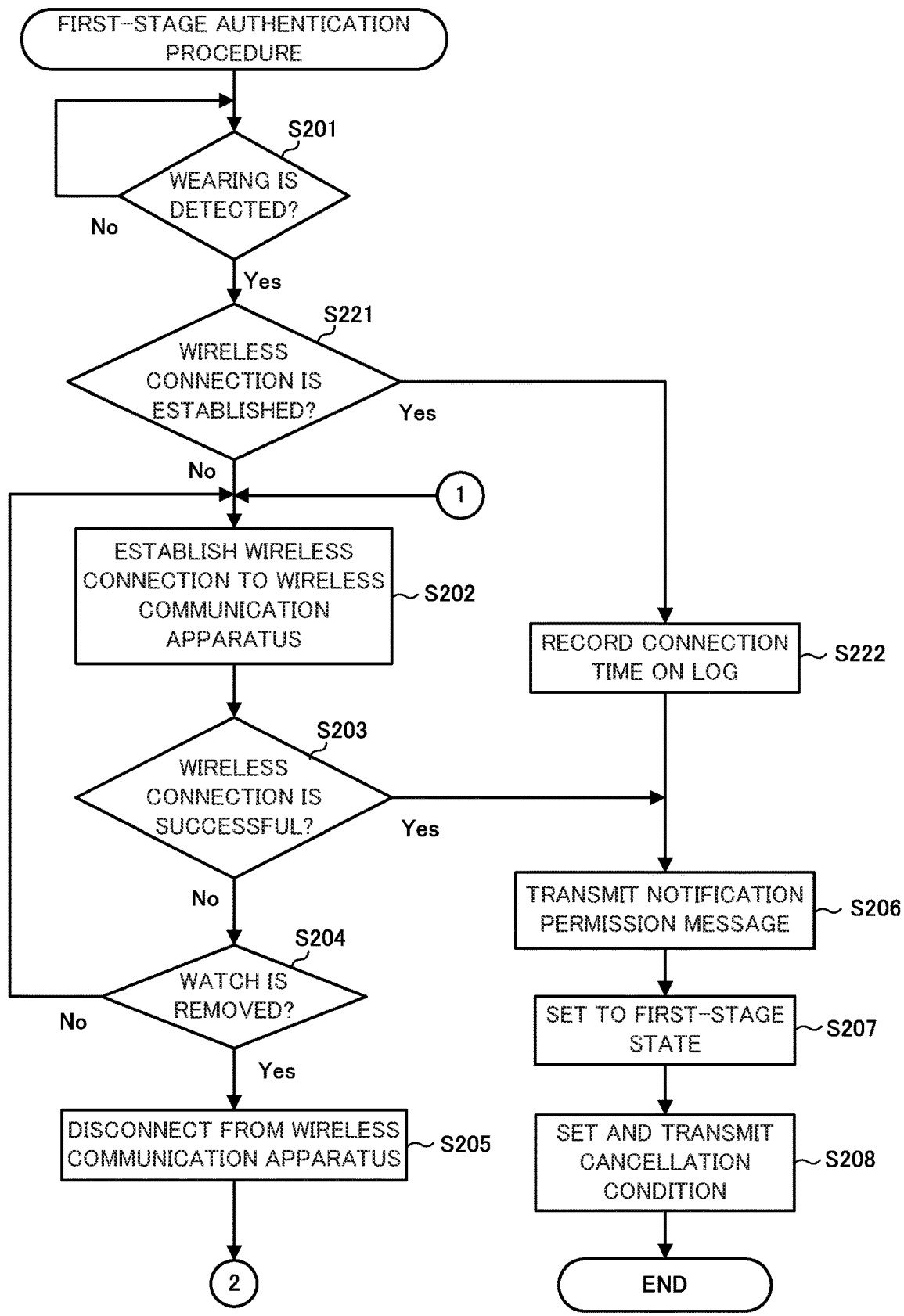
FIG. 11 is a flowchart of the first-stage authentication procedure of the electronic watch according to Embodiment 2.

In Step S221, the controller 120 of the electronic watch 101 determines whether the wireless connection to the wireless communication apparatus 200 is established by means of the communicator 131. This determination is performed because the wireless connection to the wireless communication apparatus 200 may be established by the processing in Step S121 of the above-described security setting procedure (FIG. 10). If wireless connection to the wireless communication apparatus 200 is established (Step S221; Yes), the controller 120 records information that presents how long the connection to the wireless communication apparatus 200 is going on (for example, "30 seconds of connection") on the RAM 114 as a log (Step S222) and proceeds to Step S206. If the wireless connection to the wireless communication apparatus 200 is not established (Step S221; No), the controller 120 proceeds to Step S202.

Figure 12:
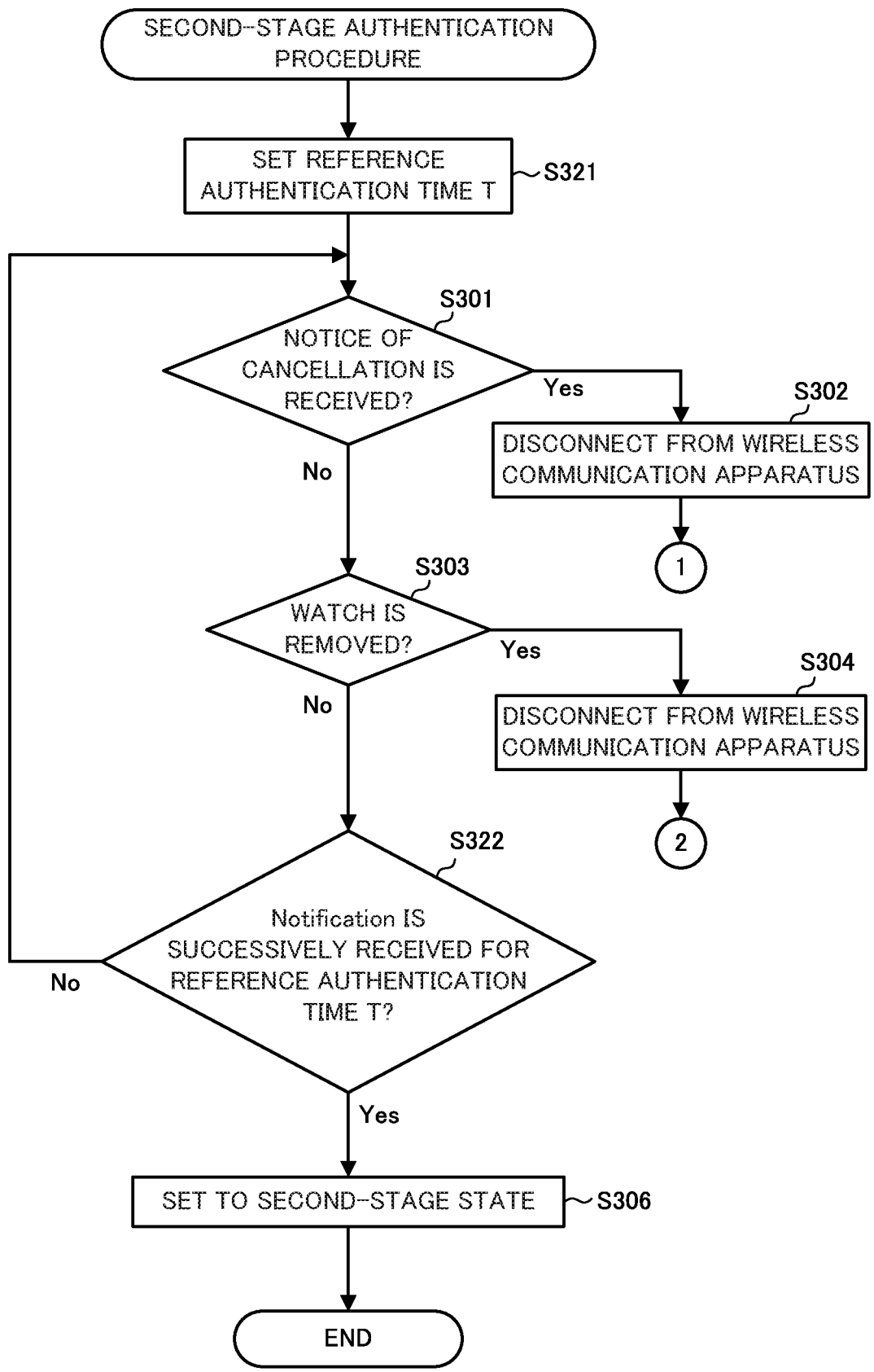
FIG. 12 is a flowchart of the second-stage authentication procedure of the electronic watch according to Embodiment 2.

As described above, in the first-stage authentication procedure of the electronic watch 101 (FIG. 11), it is determined whether wireless connection to the wireless communication apparatus 200 is established in Step S221, whereby it is possible to prevent wasteful processing such as attempting to establish connection again, though already connected, and to record on the log how long the connection is going on in Step S222 if already connected. Next, the second-stage authentication procedure of the electronic watch 101 will be described mainly regarding the difference from the second-stage authentication procedure of the electronic watch 100 (FIG. 7) with reference to FIG. 12.

Figure 7:
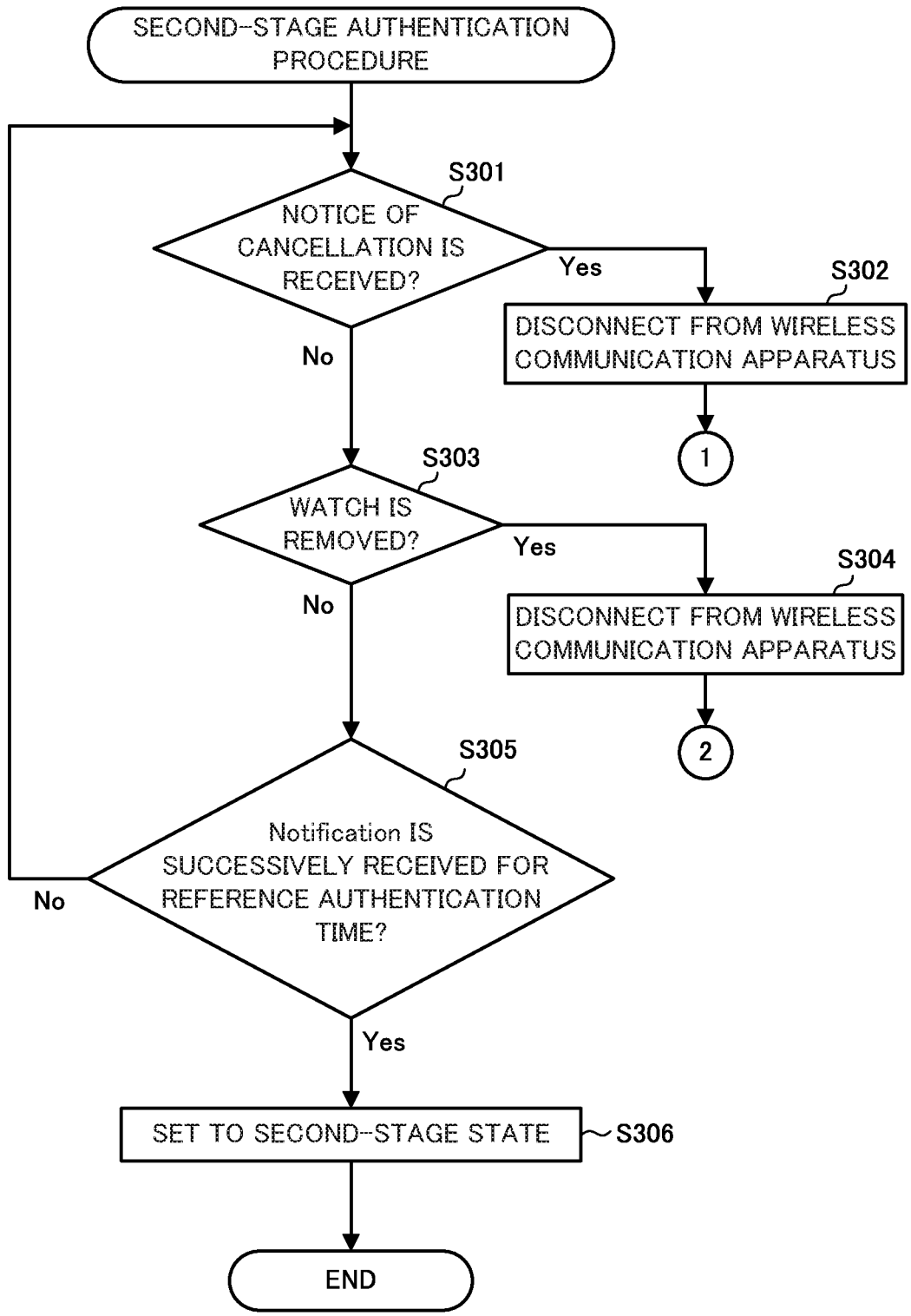
FIG. 7 is a flowchart of the second-stage authentication procedure of the electronic watch according to Embodiment 1.

In the second-stage authentication procedure of the electronic watch 101 (FIG. 12), the processing in Step S321 is performed before Step S301 of the second-stage authentication procedure of the electronic watch 100 (FIG. 7) and the determination in Step S322 is performed in place of the determination in Step S305. The other processing is the same as in the second-stage authentication procedure of the electronic watch 100 (FIG. 7).

In Step S321, the controller 120 sets a value of a reference authentication time T that is used in Step S322 that is described later based on the contents of the log that is recorded in Step S121 of the above-described security setting procedure (FIG. 10). For example, if the latest content of the log is "unsuccessful connection," this means that the electronic watch 101 failed to establish a wireless connection to the wireless communication apparatus 200. Then, the reference authentication time T is set to a time (for example, five minutes) that is equivalent to the reference authentication time in Step S305 of the second-stage authentication procedure of the electronic watch 100 according to Embodiment 1 (FIG. 7).

If the latest content of the log is "successful connection" or information that indicates connected (for example, "30 seconds of connection"), the value of the reference authentication time T is set to a lower value (for example, one minute) according to the content of the log. In doing so, it may be possible that according not only to the latest content of the log but also to the probability of "successful connection" on the log of, for example, the last 10 connections (for example, the number of times of successful connection/(the number of times of successful connection+the number of times of unsuccessful connection)), the value of the reference authentication time T is set to a lower value (the authentication time is reduced) if the probability is high and the value of the reference authentication time T is set to a higher value (the authentication time is extended) if the probability is low. Moreover, when already connected, it is possible to subtract the ongoing connection time (for example, 30 seconds) from a value that is intended to set as the reference authentication time T and set the outcome as T.

Then, in Step S322, the controller 120 determines whether Notification is successively received from the wireless communication apparatus 200 by means of the communicator 131 for the reference authentication time T. If the electronic watch 101 is not successively receiving Notification from the wireless communication apparatus 200 for the reference authentication time T (Step S322; No), the controller 120 returns to Step S301. If the electronic watch 101 is successively receiving Notification from the wireless communication apparatus 200 for the reference authentication time T (Step S322; Yes), the controller 120 proceeds to Step S306.

As described above, in the second-stage authentication procedure of the electronic watch 101 (FIG. 12), the reference authentication time T that is required for authentication can be changed based on the status of the connection to the wireless communication apparatus 200 that is recorded on the log. For example, when wireless connection to the wireless communication apparatus 200 is stably established in the initial state, the electronic watch 101 can affirm safe regarding security and reduce the reference authentication time T that is required for the second-stage authentication.

Thus, the electronic watch 101 can shift the security state to the second-stage state in a relatively short time in comparison with the electronic watch 100 while taking the security into account, thereby improving the user-friendliness while maintaining the security.

Modified Embodiment 1 of Embodiment 2

Here, in Step S321 of the above-described second-stage authentication procedure (FIG. 12), the controller 120 sets the value of the reference authentication time T that is used in Step S322 based on the status of the connection to the wireless communication apparatus 200 that is recorded on the log. This is not restrictive. For example, the controller 120 may set a value that is preliminarily entered by the user from the input receiver 133 as the value of the reference authentication time T in Step S321. For example, the user who uses the credit card function but does not use the electronic money function presumably has the electronic money balance of zero. Therefore, it will cause no security issue to set the reference authentication time T to 0 and immediately shift to the second-stage state. In such a case, given that the reference authentication time T is set to a time that is set by the user, the user himself can set the security level of the electronic watch 101 on an arbitrary basis.

Here, the upper limit of payment with a credit card is generally higher than the upper limit of payment with electronic money. Therefore, in the above-described embodiments, the function of payment with a credit card is usable only in the highest security level state (the third-stage state). This is not restrictive. For example, it may be possible that the function of payment with a credit card is usable in the second-stage state and the function of payment with electronic money is usable only in the third-stage state. Moreover, it may be possible that both the function of payment with electronic money and the function of payment with a credit card are usable only in the third-stage state or both are usable in the second-stage state.

Moreover, the present disclosure is not confined to the above-described embodiments and various combinations, and changes can be made. For example, the above embodiments are described using an electronic watch as an example of the electronic terminal that comprises the function of near field communication and the function of payment. However, the present disclosure is applicable not only to electronic watches but also to any electronic terminals that comprise the function of near field communication and the function of payment such as smartwatches, physical activity monitors, and wearable devices. Moreover, for example, the combination of Embodiment 1 and Modified Embodiment 1 of Embodiment 2 makes it possible for the user to set the time that is required to shift to the second-stage state on an arbitrary basis without establishing a wireless connection to the wireless communication apparatus 200 in the initial state or recording the log.

Here, the functions of the electronic watches 100 and 101 and the wireless communication apparatus 200 can also be implemented by a computer such as a conventional personal computer (PC). Specifically, the above embodiments are described on the assumption that the program for the security setting procedure that is performed by the electronic watches 100 and 101 is prestored on the ROM 134. Moreover, the explanation is made on the assumption that the program for the cancellation notification procedure that is performed by the wireless communication apparatus 200 is prestored on the ROM of the storage 220. However, the programs may be saved and distributed on a non-transitory computer-readable recording medium such as a flexible disc, a compact disc read-only memory (CD-ROM), a digital versatile disc (DVD), and a magneto-optical disc (MO), and read and installed on a computer to configure a computer that can realize the above-described functions.

The preceding describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, together with the full range of equivalents to which such claims are entitled.

What is claimed is:

1. An electronic terminal with a function of payment, the electronic terminal comprising:
   a wearing detector that detects whether the electronic terminal is worn by a user;
   a communicator that communicates with a wireless communication apparatus via near field communication; and
   a processor that changes, based on information obtained by the wearing detector and the communicator, whether to enable or disable use of the function of payment,
   wherein the processor:
   disables the use of the function of payment unless data transmitted by the wireless communication apparatus is successively received by the communicator within a period of time set as a reference authentication time;
   periodically attempts to establish a wireless connection with the wireless communication apparatus using the communicator; and
   reduces the period of time set as the reference authentication time if a ratio of successful connections to a total number of connection attempts increases;
   wherein the processor further:
   sets a security state to one of an initial state, a first-stage state, a second-stage state, and a third-stage state based on the information obtained by the wearing detector and the communicator, wherein a security level is different for each of the initial state, the first-stage state, the second-stage state, and the third-stage state; and
   disables or enables the use of the function of payment based on the set security state;
   wherein in the initial state, the electronic terminal is enabled to perform only standard functions as a watch, and use of the function of payment is disabled in the initial state;
   wherein in the first-stage state, the electronic terminal is enabled to perform a BLE cooperative function, in addition to the standard functions enabled in the initial state;
   wherein in the second-stage state, the electronic terminal is enabled to perform the function of payment using electronic money, in addition to the BLE cooperative function and the standard functions enabled in the first-stage state;
   wherein in the third-stage state, the electronic terminal is enabled to perform the function of payment with a credit card, in addition to the function of payment using electronic money, the BLE cooperative function, and the standard functions enabled in the second-stage state.

2. The electronic terminal according to claim 1, further comprising:
storage that registers an identification number of the wireless communication apparatus thereon,
wherein the processor disables the use of the function of payment unless an identification number of the wireless communication apparatus received by the communicator matches the identification number registered on the storage.

3. The electronic terminal according to claim 2, wherein the processor registers on the storage an identification number of a wireless communication apparatus that is different from the identification number of the wireless communication apparatus already registered on the storage by erasing the identification number already registered on the storage.

4. The electronic terminal according to claim 1, wherein the processor changes the reference authentication time based on a status of communication with the wireless communication apparatus using the communicator.

5. The electronic terminal according to claim 1, wherein the processor changes the reference authentication time based on a value that is entered by the user.

6. The electronic terminal according to claim 1, wherein:
the function of payment with the credit card has a higher upper limit of payment than the function of payment using electronic money, and
the processor acquires a password that is entered by a user, determines whether the acquired password is correct, and disables use of the function of payment with the credit card unless a determination is made that the acquired password is correct.

7. The electronic terminal according to claim 1, wherein:
the electronic terminal has the BLE cooperative function which enables the electronic terminal to cooperate with the wireless communication apparatus via communication with the wireless communication apparatus using the communicator, and
the processor disables use of the BLE cooperative function unless the wearing detector detects that the electronic terminal is being worn by the user.

8. The electronic terminal according to claim 7, wherein the processor disables the use of the function of payment unless the use of the BLE cooperative function is enabled.

9. An electronic watch, comprising:
the electronic terminal according to claim 1; and
a clock that keeps date and time.

10. A security setting method for an electronic terminal with a function of payment, the method comprising:
a wearing detection step of detecting whether the electronic terminal is worn by a user;
a communication step of communicating with a wireless communication apparatus via near field communication; and
a security setting step of changing, based on information that is obtained in the wearing detection step and the communication step, whether to enable or disable use of the function of payment,
wherein the security setting step comprises:
disabling the use of the function of payment unless data transmitted by the wireless communication apparatus is successively received within a period of time set as a reference authentication time;
periodically attempting to establish a wireless connection with the wireless communication apparatus using the communicator; and
reducing the period of time set as the reference authentication time if a ratio of successful connections to a total number of connection attempts increases;
wherein the security setting step further comprises:
setting a security state to one of an initial state, a first-stage state, a second-stage state, and a third-stage state based on the information obtained by the wearing detector and the communicator, wherein a security level is different for each of the initial state, the first-stage state, the second-stage state, and the third-stage state; and
disabling or enabling the use of the function of payment based on the set security state;
wherein in the initial state, the electronic terminal is enabled to perform only standard functions as a watch, and use of the function of payment is disabled in the initial state;
wherein in the first-stage state, the electronic terminal is enabled to perform a BLE cooperative function, in addition to the standard functions enabled in the initial state;
wherein in the second-stage state, the electronic terminal is enabled to perform the function of payment using electronic money, in addition to the BLE cooperative function and the standard functions enabled in the first-stage state;
wherein in the third-stage state, the electronic terminal is enabled to perform the function of payment with a credit card, in addition to the function of payment using electronic money, the BLE cooperative function, and the standard functions enabled in the second-stage state.

11. A non-transitory recording medium storing a program that is readable by a computer of an electronic terminal with a function of payment, the program, when executed by the computer, causing the computer to execute:
a wearing detection step of detecting whether the electronic terminal is worn by a user;
a communication step of communicating with a wireless communication apparatus via near field communication; and
a security setting step of changing, based on information that is obtained in the wearing detection step and the communication step, whether to enable or disable use of the function of payment,
wherein the security setting step comprises:
disabling the use of the function of payment unless data transmitted by the wireless communication apparatus is successively received within a period of time set as a reference authentication time;
periodically attempting to establish a wireless connection with the wireless communication apparatus using the communicator; and
reducing the period of time set as the reference authentication time if a ratio of successful connections to a total number of connection attempts increases;
wherein the security setting step further comprises:
setting a security state to one of an initial state, a first-stage state, a second-stage state, and a third-stage state based on the information obtained by the wearing detector and the communicator, wherein a security level is different for each of the initial state, the first-stage state, the second-stage state, and the third-stage state; and
disabling or enabling the use of the function of payment based on the set security state;

wherein in the initial state, the electronic terminal is enabled to perform only standard functions as a watch, and use of the function of payment is disabled in the initial state;

wherein in the first-stage state, the electronic terminal is enabled to perform a BLE cooperative function, in addition to the standard functions enabled in the initial state;

wherein in the second-stage state, the electronic terminal is enabled to perform the function of payment using electronic money, in addition to the BLE cooperative function and the standard functions enabled in the first-stage state;

wherein in the third-stage state, the electronic terminal is enabled to perform the function of payment with a credit card, in addition to the function of payment using electronic money, the BLE cooperative function, and the standard functions enabled in the second-stage state.

* * * * *

UNITED STATES PATENT AND TRADEMARK OFFICE
CERTIFICATE OF CORRECTION

| | | |
|---|---|---|
| PATENT NO. | : 11,222,332 B2 | |
| APPLICATION NO. | : 16/295539 | |
| DATED | : January 11, 2022 | |
| INVENTOR(S) | : Kazuho Kyou et al. | |

It is certified that error appears in the above-identified patent and that said Letters Patent is hereby corrected as shown below:

On the Title Page

Below item (65), insert item (30):
-- Foreign Application Priority Data
Mar. 23, 2018 (JP) ................. 2018-055701 --.

Signed and Sealed this
Twenty-fourth Day of May, 2022

Katherine Kelly Vidal
*Director of the United States Patent and Trademark Office*